United States Patent
Yoshida

(10) Patent No.: US 10,855,915 B2
(45) Date of Patent: Dec. 1, 2020

(54) IMAGE PICKUP APPARATUS CAPABLE OF CONSECUTIVELY DISPLAYING DIFFERENT TYPES OF IMAGE, CONTROL METHOD, AND STORAGE MEDIUM

(71) Applicant: CANON KABUSHIKI KAISHA, Tokyo (JP)

(72) Inventor: Akimitsu Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/260,503

(22) Filed: Jan. 29, 2019

(65) Prior Publication Data
US 2019/0238748 A1  Aug. 1, 2019

(30) Foreign Application Priority Data

Jan. 31, 2018 (JP) .................................. 2018-015728

(51) Int. Cl.
| | |
|---|---|
| H04N 5/232 | (2006.01) |
| G06T 7/70 | (2017.01) |
| G06T 7/20 | (2017.01) |
| G06K 9/32 | (2006.01) |
| G06K 9/00 | (2006.01) |

(52) U.S. Cl.
CPC ....... *H04N 5/23229* (2013.01); *G06K 9/3241* (2013.01); *G06T 7/20* (2013.01); *G06T 7/70* (2017.01); *H04N 5/23245* (2013.01); *H04N 5/23293* (2013.01)

(58) Field of Classification Search
CPC .......... H04N 5/23229; H04N 5/23245; G06K 9/3241; G06K 9/00771; G06T 7/20; G06T 7/70
See application file for complete search history.

(56) References Cited

U.S. PATENT DOCUMENTS

| | | | | |
|---|---|---|---|---|
| 5,892,991 A | * | 4/1999 | Hamada .................. | G03B 17/20 396/147 |
| 6,084,939 A | * | 7/2000 | Tamura .................. | G01T 1/2928 348/E5.086 |

FOREIGN PATENT DOCUMENTS

JP      2015-144346 A     8/2015

* cited by examiner

*Primary Examiner* — Ahmed A Berhan
(74) *Attorney, Agent, or Firm* — Canon U.S.A., Inc., IP Division

(57) ABSTRACT

A display control unit is provided to set a first display mode and a second display mode each for consecutively displaying a first display image and a second display image of a type different from the first display image at a display unit, while switching between the first display image and the second display image, in continuous image-capturing. A time from when the first display image is displayed until when the second display image is displayed next is shorter in the first display mode as compared to the second display mode. The display control unit performs switching between the first display mode and the second display mode, based on information about a movement of an object in the continuous image-capturing.

15 Claims, 7 Drawing Sheets

IMAGE PICKUP APPARATUS CAPABLE OF CONSECUTIVELY DISPLAYING DIFFERENT TYPES OF IMAGE, CONTROL METHOD, AND STORAGE MEDIUM

BACKGROUND

Field

The present disclosure relates to an image pickup apparatus capable of displaying different types of images, a control method for the image pickup apparatus, and a storage medium.

Description of the Related Art

In general, an image pickup apparatus such as a digital camera has a continuous image-capturing (continuous photographing) function of consecutively acquiring still images. It has been known that, in the continuous image-capturing, different types of image that are a live view image for live view (LV) and a still image for recording (a recorded image) are each read into a display unit such as a back monitor provided in the image pickup apparatus so that the read images are displayed and recorded in real time.

For example, there is known a technology for improving capability of following a main object in focus detection, by displaying a live view image (a LV image) acquired from an imaging device at a display device, while performing focus detection in continuous image-capturing. Japanese Patent Application Laid-Open No. 2015-144346 discusses a technology for switching between displaying images of different resolutions consecutively and displaying only a high-resolution image at a display device. According to Japanese Patent Application Laid-Open No. 2015-144346, capability of following a main object in framing can be improved by reducing a display period interval for a LV image, in continuous photographing with a low frame rate as well.

SUMMARY

According to an aspect of the present disclosure, an image pickup apparatus includes an imaging device, and can perform continuous image-capturing for capturing consecutive images of an object using the imaging device, the image pickup apparatus including a display unit configured to acquire a first image and a second image of a resolution lower than a resolution of the first image using the imaging device, and to cause display of a first display image corresponding to the first image and a second display image corresponding to the second image, and a display control unit configured to set a first display mode and a second display mode different from the first display mode each for consecutively displaying the first display image and the second display image at the display unit, while switching between the first display image and the second display image in the continuous image-capturing, wherein a time from when the first display image is displayed until when the second display image is displayed next is shorter in the first display mode as compared to the second display mode, and wherein the display control unit performs switching between the first display mode and the second display mode, based on information about a movement of an object in the continuous image-capturing.

Further features of the present invention will become apparent from the following description of exemplary embodiments with reference to the attached drawings.

DESCRIPTION OF THE EMBODIMENTS

Figure 1:
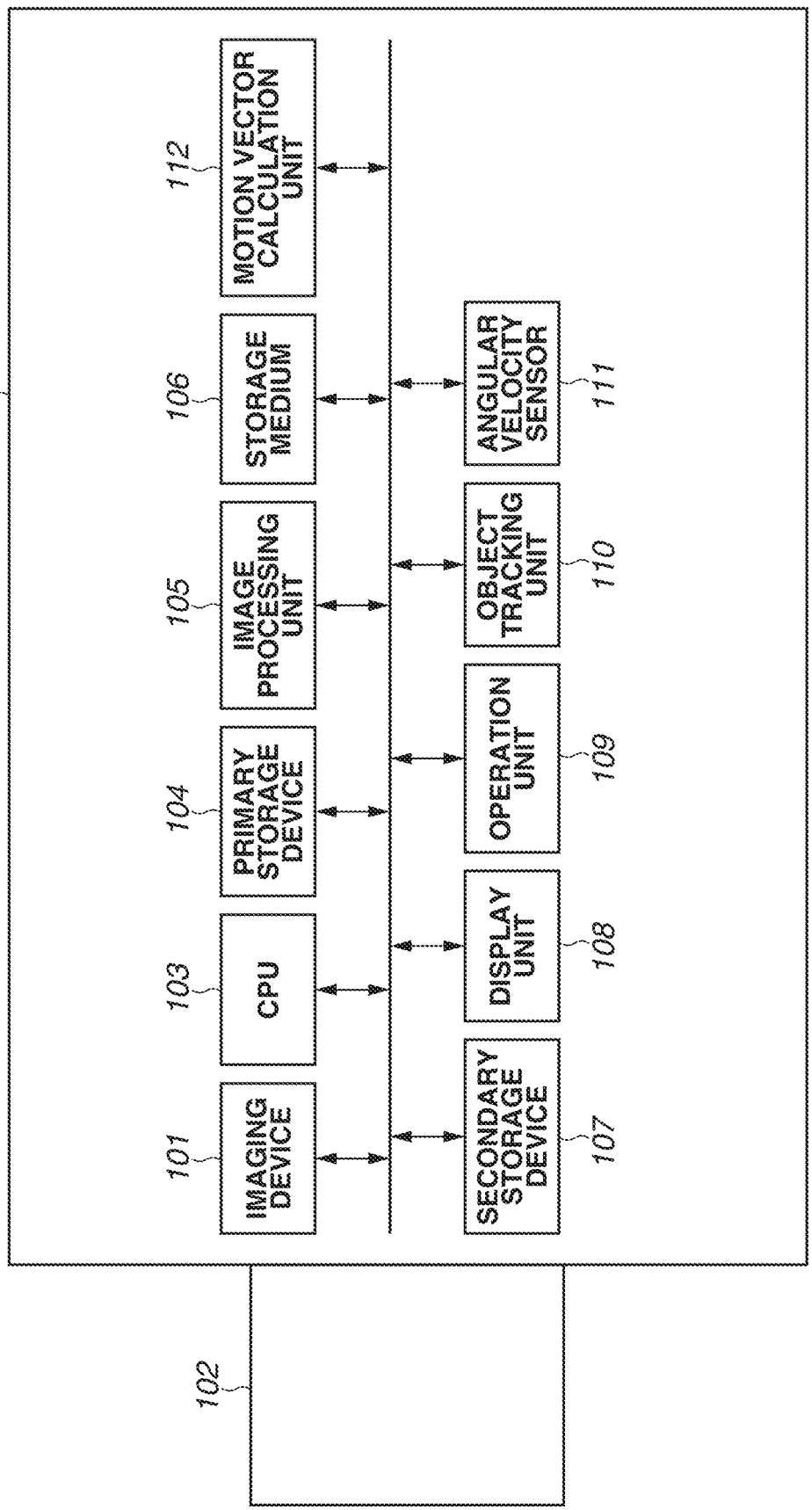
FIG. 1 is a block diagram illustrating a schematic configuration of an image pickup apparatus according to an exemplary embodiment of the present disclosure.

Exemplary embodiments of the present disclosure will be described in detail below with reference to the attached drawings. FIG. 1 is a block diagram illustrating a schematic configuration of an image pickup apparatus 100 according to an exemplary embodiment of the present invention. The image pickup apparatus 100 includes cameras such as a digital camera and a digital video camera, and portable apparatuses with a camera function such as a smartphone.

(Basic Configuration of Image Pickup Apparatus 100)

Each component of the image pickup apparatus 100 will be described below with reference to FIG. 1. An imaging device 101 is a solid-state imaging device of a charge accumulation type. For example, a charge-coupled device (CCD) image sensor or a complementary metal-oxide semiconductor (CMOS) image sensor is adopted for the imaging device 101. A light beam of an object focused through an optical system 102 including various kinds of imaging lens groups forms an image on the imaging device 101, so that photoelectric conversion is executed, and thereby an image signal is generated.

In the following description, a display mode will be described in which each of a still image (a first image) with a first resolution and a live view image (a second image) with a second resolution lower than the first resolution is used as an image to be acquired using the imaging device 101. Here, the resolutions described above each indicate a resolution of an image to be acquired, and is not synonymous with a resolution of a display image to be displayed at a display unit 108. Specifically, the resolution of the live view image (the second image) is set to be low, relative to the resolution of the still image (the first image) for recording. In contrast, a resolution of a still image (a first display image) and a resolution of a live view image (a second display image) to be displayed at the display unit 108 are not necessarily different, and can each be adjusted to a resolution that enables display by the display unit 108. In the present exemplary embodiment, the number of pixels (a second number of pixels) of the imaging device 101 to be used in acquisition of the live view image is small than the number of effective pixels (a first number of pixels) of a pixel portion of the imaging device 101 to be used in acquisition of the still image. Specifically, the live view image is acquired by performing thinning or adding using a predetermined pixel of the pixel portion of the imaging device 101, and reading out electric charges accumulated in the corresponding pixel. In the present exemplary embodiment, the live view image is acquired by thinning the imaging device 101 for every predetermined row, and reading out electric charges.

The optical system 102 includes the above-described imaging lens groups and an aperture, and is controlled by a central processing unit (CPU) 103 to be described below. In the present exemplary embodiment, a lens-interchangeable image pickup apparatus will be described as the image pickup apparatus 100. The image pickup apparatus 100 includes a mount unit corresponding to a mount unit of the optical system 102 so that the optical system 102 is attachable to the image pickup apparatus 100. However, the image pickup apparatus 100 is not limited to the example. The image pickup apparatus 100 may be, for example, a lens-integrated image pickup apparatus with the optical system 102 built therein.

The CPU 103 is a control unit represented by a microprocessor for controlling the entire image pickup apparatus 100, and controls each component of the image pickup apparatus 100 based on an input signal and a program stored beforehand. In particular, in each exemplary embodiment to be described below, the CPU 103 operates as a display control unit that can set a display mode for consecutively displaying the still image and the live view image at the display unit 108 while switching between the still image and the live view image in continuous image-capturing.

For example, a primary storage device 104 is, for example, a volatile memory such as a random access memory (RAM), and stores temporary data. The primary storage device 104 is used for work of the CPU 103. Further, information stored in the primary storage device 104 is used in an image processing unit 105 or recorded into a storage medium 106. A secondary storage device 107 is, for example, a nonvolatile memory such as an electrically erasable programmable read-only memory (EEPROM). The secondary storage device 107 stores a program (firmware) for controlling the image pickup apparatus 100 and various kinds of setting information. The secondary storage device 107 is used by the CPU 103. The storage medium 106 can record data such as image data stored into the primary storage device 104 upon being obtained by image capture. The storage medium 106 is removable from the image pickup apparatus 100 like a semiconductor memory card, for example. The recorded data can be read out by attaching the storage medium 106 to an apparatus such as a personal computer. In other words, the image pickup apparatus 100 has a mechanism for attaching and detaching the storage medium 106, and a reading and writing function.

An angular velocity sensor 111 is, for example, a gyro sensor. The angular velocity sensor 111 periodically detects an angular velocity that represents a movement amount of the image pickup apparatus 100 mounted with the angular velocity sensor 111. The angular velocity sensor 111 converts the detected movement amount into an electrical signal and transmits the electrical signal to the CPU 103.

In the image pickup apparatus 100 of the present exemplary embodiment, the image processing unit 105 has a plurality of patterns of image processing to be applied to a picked-up image. The plurality of patterns is provided as a plurality of image-pickup modes. The image pickup apparatus 100 is configured in such a manner that any of the plurality of imaging modes can be selectively set from an operation unit 109. The image processing unit 105 also has a function of performing image processing using information about an object area within an image supplied from an object tracking unit 110 to be described below, including image processing called development processing. The image processing unit 105 also has a function of detecting a motion vector between pieces of image data of image signals that are sequentially supplied from the imaging device 101 in a time series.

The display unit 108 has a function as an electronic viewfinder. The display unit 108 can display a still image and a moving image obtained by imaging an object, and display a graphical user interface (GUI) for operations. Further, the display unit 108 can display an object area including a tracking-target object identified by the object tracking unit 110 to be described below, in a predetermined form (e.g., displayed in a rectangular frame). Display of a moving image that can be displayed by the display unit 108 includes live view display. In the live view display, image signals are acquired temporally in succession, and display images are sequentially displayed based on these image signals. In the present exemplary embodiment, operation for acquiring the still image is executed by an instruction for start of imaging preparation or start of imaging that is issued by a user during the live view display.

An operation unit 109 is an input device group that transmits input information to the CPU 103 by receiving an operation performed by the user. For example, the operation unit 109 may include a button, a lever, a touch panel, and an input device using sound or a line of sight. Further, the operation unit 109 includes a release button. The operation unit 109 thereby serves as an instructing unit for turning on a switch SW1 (not illustrated) in response to a half-press operation performed on the release button, and turning on a switch SW2 (not illustrated) in response to a full-press operation performed on the release button. In other words, a two-step switch configuration is adopted. In the image pickup apparatus 100 of the present exemplary embodiment, an instruction for start of image-capturing preparation operation, including focus detection operation and photometry operation, is provided by turning on the switch SW1. Further, an instruction for start of operation for imaging an object is provided by turning on the switch SW2.

The object tracking unit 110 detects an object included in successive image signals that are sequentially supplied from the image processing unit 105 in a time series (for example, by imaging an object sequentially), and tracks the detected object. Specifically, the object tracking unit 110 compares the temporally successive image signals supplied from the image processing unit 105, and tracks a predetermined object by, for example, tracking a partial area having similar pixel patterns or histograms of the image signals. The predetermined object may be an object designated by a manual operation performed by the user. Alternatively, the predetermined object may be an object determined by automatically detecting a predetermined object area such as a face area of a person, based on an imaging condition or an image capture mode. Any type of method may be adopted for a method of detecting the predetermined object area. For example, the image pickup apparatus 100 may have such a configuration that an edge pattern for detecting a predetermined object within an image is recorded beforehand, and the predetermined object is detected by pattern matching between the edge pattern and an image signal.

A motion vector calculation unit 112 calculates a motion vector for every predetermined divisional area, based on image signals sequentially supplied from the image processing unit 105 in a time series. For temporally successive images to be used in calculating the motion vector, a configuration for comparing the live view image and the still image may be adopted, or a configuration for comparing the live view images or the still images may be adopted.

The image pickup apparatus 100 of the present exemplary embodiment can switch between display modes to be described below, based on information about a movement of an object. Examples of the information about the movement of the object include a tracking result obtained by the object tracking unit 110, an output of the angular velocity sensor 111, and a calculation result obtained by the motion vector calculation unit 112. This will be described in detail below.

(Details of Display Mode)

Details of a display mode in the continuous image-capturing will be described below with reference to FIG. 2 and FIG. 3. The following description is premised on a configuration for displaying the live view image and the still image alternately with fixed timing, during the execution of the continuous image-capturing, as a display mode of the image pickup apparatus 100.

For example, when an instruction for start of the live view display is provided in response to an operation performed on the operation unit 109 or power-on of the image pickup apparatus 100, the CPU 103 performs exposure processing by controlling the operation of each of the optical system 102 and the imaging device 101. After the exposure processing is performed for a predetermined time, the CPU 103 reads out an image signal from the imaging device 101 and stores the image signal into the primary storage device 104. The image processing unit 105 executes image processing on the image signal stored in the primary storage device 104, and the processed image signal (image data) is stored into the primary storage device 104 again. The live view image is acquired by reading out accumulated charges of a predetermined area (e.g., each of rows located at predetermined intervals) of the imaging device 101. In contrast, the still image is acquired by reading out accumulated charges for all the effective pixels of the imaging device 101. The still image may be at least configured to have readout pixel areas more than those of the live view image.

Next, upon completion of generation of the image data, the CPU 103 displays the live view image at the display unit 108. Further, the image data is sent to the object tracking unit 110, and processing for tracking the object is executed. Afterward, in a case where no instruction is provided from the operation unit 109, the above-described processes are repeated (referred to as "live-view capture state").

Here, a display delay $lv\_d0$ of a live view image 0 is expressed in $lv\_d0=lv\_e0-lv\_a0$. Note that $lv\_a0$ represents a temporal centroid (an exposure centroid) from exposure start to exposure termination of the live view image 0, and $lv\_e0$ represents a time for displaying image data corresponding to the live view image 0 at the display unit 108.

In the live-view capture state, when the switch SW2 is turned on, operation for imaging the still image begins. In the imaging for the still image, a series of processes including exposure, readout, image processing, and object tracking are performed, and image data is displayed at the display unit 108 by control of the CPU 103, as in imaging for the live view. A display delay $st\_d1$ of a still image 1 is also expressed in $st\_d1=st\_e1-st\_a1$, as in live-view capture. Note that $st\_a1$ represents a temporal centroid (an exposure centroid) from exposure start to exposure termination of the still image 1, and $st\_e1$ represents a time for displaying image data corresponding to the still image 1 at the display unit 108. Afterward, while the switch SW2 remains on, similar processes are repeated, as illustrated in FIG. 2.

Figure 2:
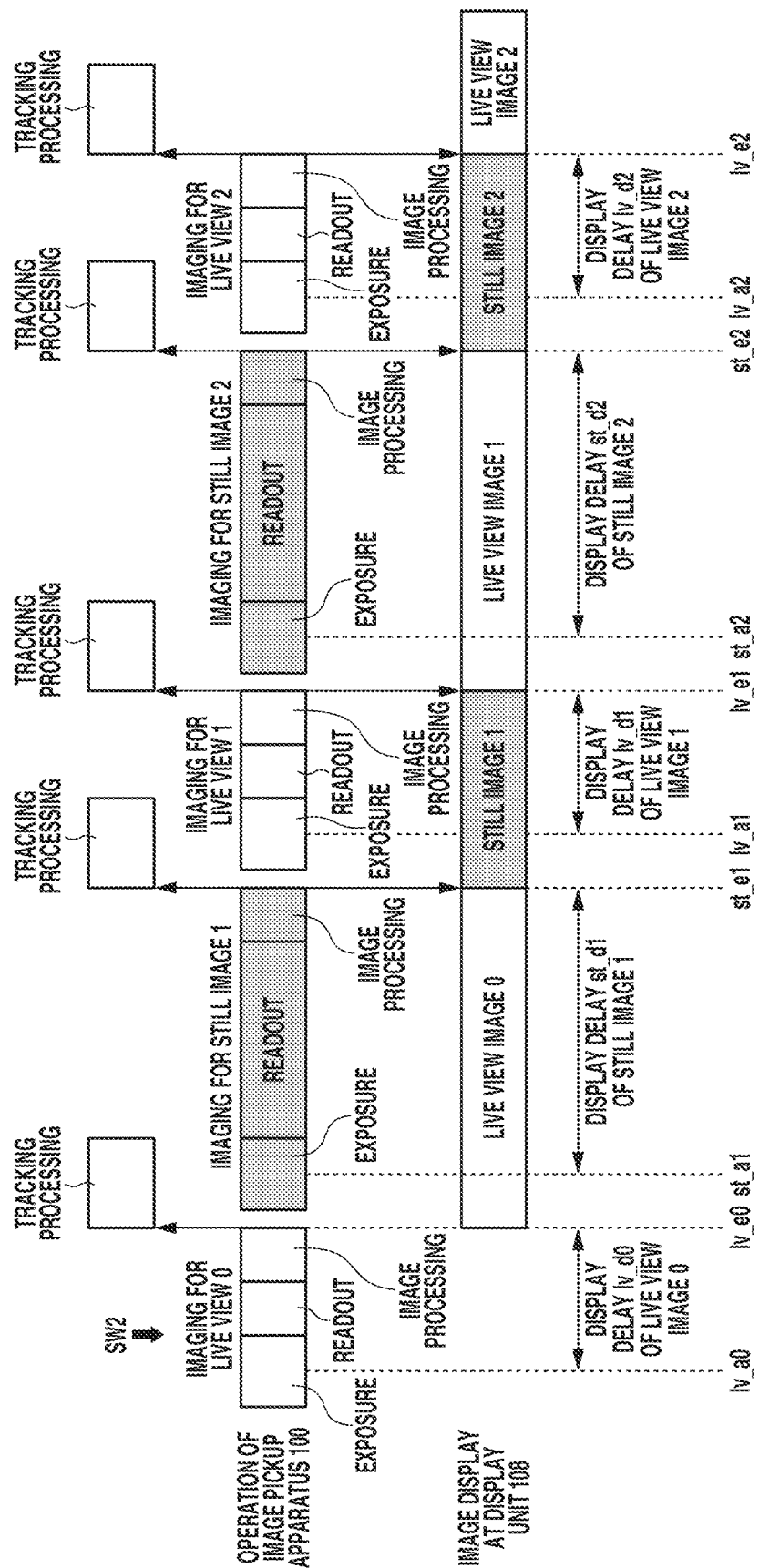
FIG. 2 is a diagram illustrating operation in continuous image-capturing in a display delay reduction mode in the image pickup apparatus according to the exemplary embodiment of the present disclosure.
Figure 3:
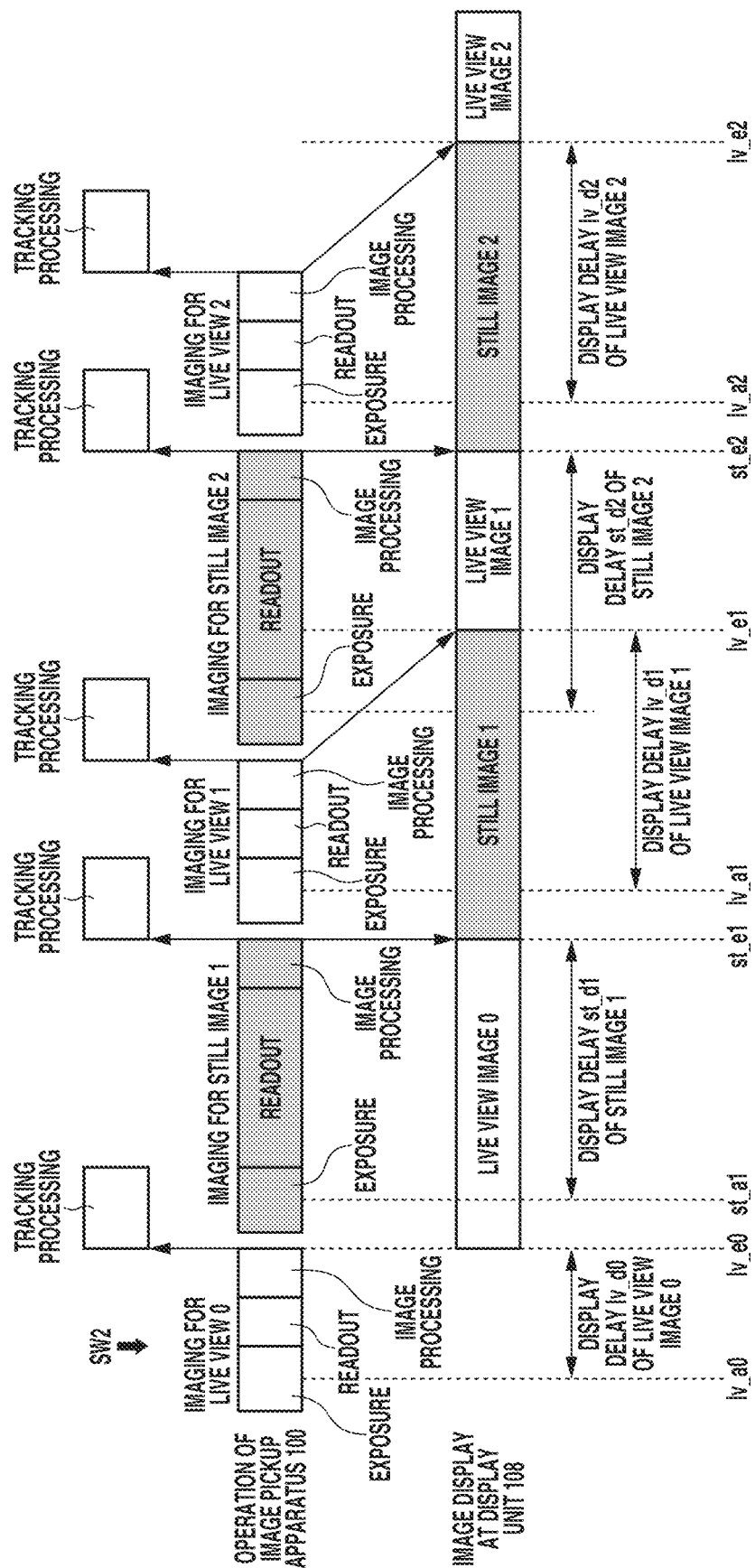
FIG. 3 is a diagram illustrating operation in the continuous image-capturing in a display delay adjustment mode in the image pickup apparatus according to the exemplary embodiment of the present disclosure.

FIG. 2 is a diagram illustrating operation in the continuous image-capturing in a display delay reduction mode in the image pickup apparatus 100 according to the exemplary embodiment of the present invention. As illustrated in FIG. 2, the image data of the still image and the image data of the live view are displayed immediately after completion of the image processing. A display mode of the image pickup apparatus 100 corresponding to the operation illustrated in FIG. 2 is referred to as the display delay reduction mode. Assuming that a display delay of an nth live view image (n is a natural number of 0 or more) is $lv\_dn$, and a display delay of an nth still image is $st\_dn$, $lv\_dn<st\_dn$ is established. This is because a data amount to be processed for the still image is greater than that for the live view image in the display delay reduction mode.

In the display delay reduction mode, the CPU 103 controls the timing of display at the display unit 108 to minimize a delay from acquisition of image data (or exposure and readout) to display, for each of the live view image and the still image.

Therefore, in the display delay reduction mode, there is such an advantageous that owing to a small display delay, it is easy to contain an object serving as an imaging target in a field angle (a screen), in a case where an object motion is large or a panning amount of the image pickup apparatus 100 is large. However, in a case where the live view image and the still image that vary in display delay are alternately displayed, a feeling of strangeness that can be given to the user grows due to the difference between display timings.

Next, a display delay adjustment mode will be described with reference to FIG. 3. FIG. 3 is a diagram illustrating operation in the continuous image-capturing in the display delay adjustment mode in the image pickup apparatus 100 according to the exemplary embodiment of the present invention. The difference between the display delay adjustment mode and the above-described display delay reduction mode is the timing of displaying the live view image between imaging for the still image and the next imaging for the still image.

In the display delay adjustment mode, the CPU 103 controls display of the live view image at the display unit 108 to have the display delay $lv\_dn$ of the live view image=the display delay $st\_dn$ of the still image. In other words, in the display delay adjustment mode, display at the display unit 108 is controlled so that the display delay of the live view image and the display delay of the still image are substantially equal. Therefore, in the display delay adjustment mode, it is possible to reduce a feeling of strangeness that can be given to the user due to the difference between the display timing for the live view image and the display timing for the still image. However, in the display delay adjustment mode, the time from start of imaging (exposure) to display of the live view image at the display unit 108 is long, and therefore, it is more difficult to contain in a field angle an object that makes large or irregular movements, than in the display delay reduction mode.

For example, in a case where the continuous image-capturing is performed in a state where an object whose movement amount is substantially constant is framed within a field angle, the display delay adjustment mode is executed. This enables the continuous image-capturing to be stably performed in a state where the object is framed at a substantially fixed position within the field angle. In contrast, for example, in a case where the continuous image-capturing is performed in a state where an object whose movement amount is large or which makes an irregular movement is framed within a field angle, the display delay adjustment mode is executed. This has an advantage of accelerating a return from a search for the object deviating from the field angle to the field angle, because the time from imaging to display is short. In other words, in the display delay reduction mode, it is possible to perform the continuous image-capturing that reduces the probability of acquisition of a failure image in which a target object is not framed within a field angle.

As described above, in the display delay reduction mode, control is performed to minimize a display delay in displaying the live view image and the still image. As a result, in the display delay reduction mode, the time from when the still image is displayed at the display unit 108 until when the live view image is displayed next at the display unit 108 is reduced. In other words, in the display delay reduction mode, the time during which the live view image is displayed is longer than the time during which the still image is displayed, in a predetermined time. Further, in the display delay adjustment mode, control is performed such that the display delay of the live view image and the display delay of the still image are substantially equal. As a result, in the display delay adjustment mode, the difference between an interval from when the still image is displayed at the display unit 108 until when display of the still image starts next, and an interval from when the live view image is displayed at the display unit 108 until when display of the live view image starts next is reduced.

Figure 4:
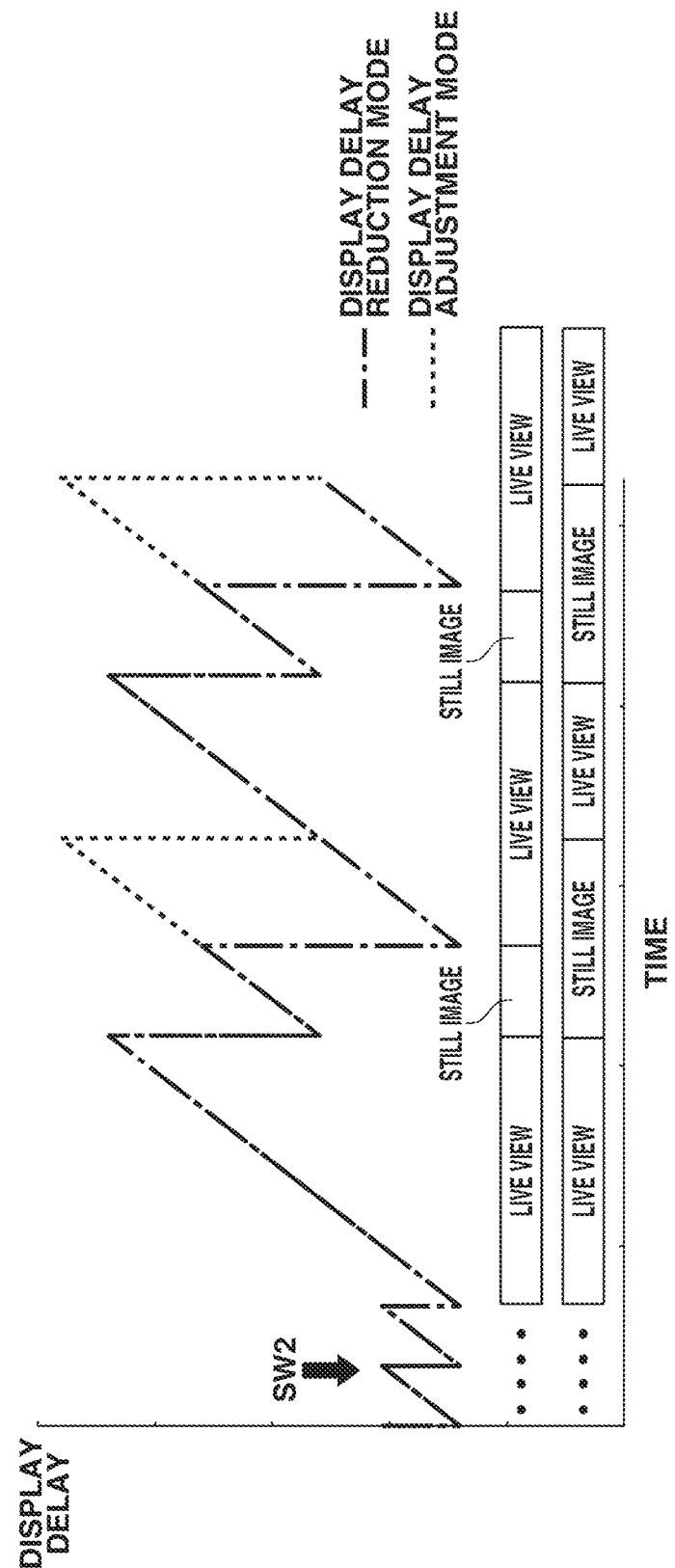
FIG. 4 is a diagram illustrating a difference between a display delay in the display delay reduction mode and a display delay in the display delay adjustment mode of the image pickup apparatus according to the exemplary embodiment of the present disclosure.

FIG. 4 is a diagram illustrating the difference between the display delay in the display delay reduction mode and the display delay in the display delay adjustment mode of the image pickup apparatus 100 according to the exemplary embodiment of the present invention. In FIG. 4, the horizontal axis represents passage of time, and the vertical axis represents degree (magnitude) of display delay. The degree of display delay becomes greater as the time from the display of an image to the display of the next image at the display unit 108 increases. In other words, the degree of display delay decreases each time the image display at the display unit 108 is updated.

In the display delay adjustment mode, the degree of display delay varies between display switching from the live view image to the still image and display switching from the still image to the live view image, less significantly than in the display delay reduction mode, as illustrated in FIG. 4.

Figure 5:
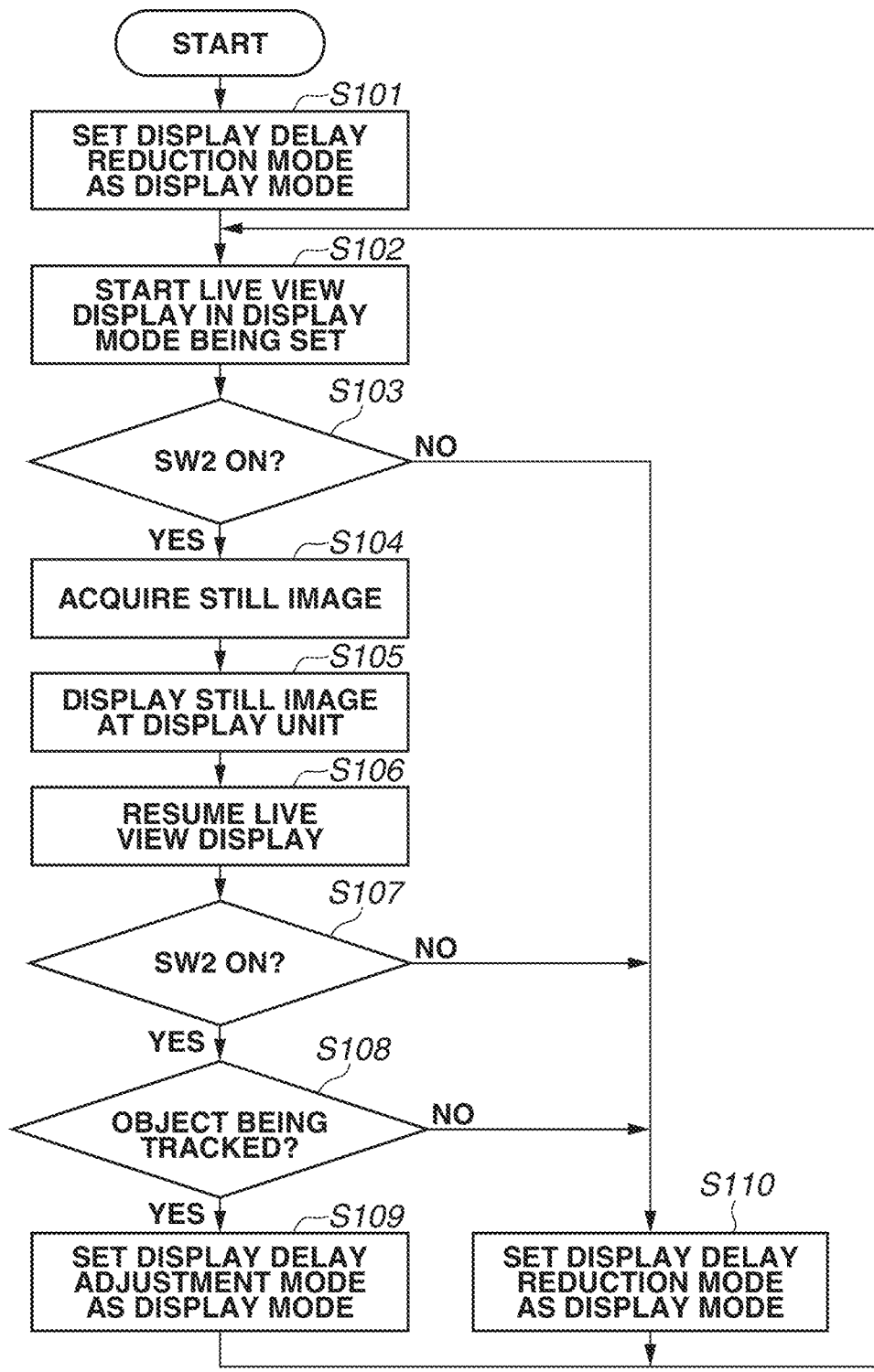
FIG. 5 is a flowchart about switching between display modes in a case where continuous image-capturing is performed during live view display, according to a first exemplary embodiment of the present disclosure.

Operation for switching between the display delay reduction mode and the display delay adjustment mode in a first exemplary embodiment of the image pickup apparatus according to the present invention will be described below with reference to FIG. 5. FIG. 5 is a flowchart about switching between the display modes in a case where the continuous image-capturing is performed during the live view display, according to the first exemplary embodiment of the present invention.

As illustrated in FIG. 5, in step S101, the CPU 103 sets the display delay reduction mode as the display mode, when an instruction for start of the live view display is provided.

Next, in step S102, the CPU 103 starts the live view display at the display unit 108, by starting imaging for the live view display in the currently set display mode.

Next, in step S103, the CPU 103 determines whether the switch SW2 is turned on. If the switch SW2 is not turned on (NO in step S103), the operation proceeds to step S110. If the CPU 103 determines that the switch SW2 is turned on (YES in step S103), the operation proceeds to step S104. In step S104, the CPU 103 executes imaging for acquiring the still image for recording. Next, in step S105, the CPU 103 displays image data (the still image) acquired by the imaging, at the display unit 108.

Next, in step S106, the CPU 103 resumes the operation for acquiring the live view image, by shifting from the operation for acquiring the still image. Subsequently, in step S107, the CPU 103 determines again whether the switch SW2 is being turned on. For example, if the ON state of the switch SW2 is maintained, the result of the determination in step S107 is YES, so that it is possible to determine that an instruction for the continuous image-capturing is provided by the user. If the CPU 103 determines that the switch SW2 is not turned on (NO in step S107), the operation proceeds to step S110.

If the CPU 103 determines that the switch SW2 is turned on (YES in step S107), the operation proceeds to step S108. In step S108, the CPU 103 determines whether an object is being tracked, based on a processing result obtained by the object tracking unit 110. Specifically, the object tracking unit 110 executes processing for tracking the object by comparing the live view image obtained in step S102 and the still image obtained in step S104. If the CPU 103 determines that the object is being tracked (YES in step S108), the operation proceeds to step S109. In step S109, the CPU 103 sets the display delay adjustment mode as the display mode. If the CPU 103 determines that the object is not being tracked (NO in step S108), the operation proceeds to step S110. In step S110, the CPU 103 sets the display delay reduction mode as the display mode. In a case where the display mode to be set is already set in each of step S109 and step S110, the current display mode is maintained. In a case where an instruction for terminating (or stopping/interrupting) the live view display is provided during execution of each step of the flowchart in FIG. 5, each step of the flowchart in FIG. 5 is terminated.

For example, in a case where it is possible to track the same object detected in the live view image and the subsequently obtained still image, it is desirable to set the display delay adjustment mode as the display mode, in order to maintain stable framing of the object at a predetermined position within the field angle. In contrast, in a case where the same object cannot be detected in the live view image and the still image and thus cannot be tracked, it is desirable to set the display delay reduction mode as the display mode, in order to re-frame the lost object (that cannot be found) into the field angle quickly.

As described above, the image pickup apparatus 100 of the present exemplary embodiment has the following configuration. In a case where the object can be tracked, the image pickup apparatus 100 gives priority to the display for reducing a feeling of strangeness that can be given to the user. On the other hand, in a case where the object cannot be tracked, the image pickup apparatus 100 gives priority to the display for reducing a delay to implement display for quickly responding to a movement of the object. The image pickup apparatus 100 of the present exemplary embodiment can thereby reduce a feeling of strangeness that can be given to the user, when sequentially displaying images different in the time required from start of exposure to completion of acquisition (e.g., the live view image and the still image during the continuous image-capturing) at the display unit 108.

Operation for switching between the display delay reduction mode and the display delay adjustment mode in a second exemplary embodiment of the image pickup apparatus according to the present invention will be described below with reference to FIGS. 6A and 6B. The first exemplary embodiment has been described above using the case where switching between the display modes is performed based on the processing result according to the object tracking by the object tracking unit 110. In contrast, in the present exemplary embodiment, the image pickup apparatus 100 will be described that adopts a configuration for switching the display modes in response to a change in attitude of the image pickup apparatus 100 that is based on an output of the angular velocity sensor 111. Each component of the image pickup apparatus 100 is identical to that in the above-described first exemplary embodiment and therefore will not be described. In addition, operation for switching the display modes is also substantially identical to that in the first exemplary embodiment except that predetermined information for switching the display modes is different, and therefore will not be described.

Figure 6A:
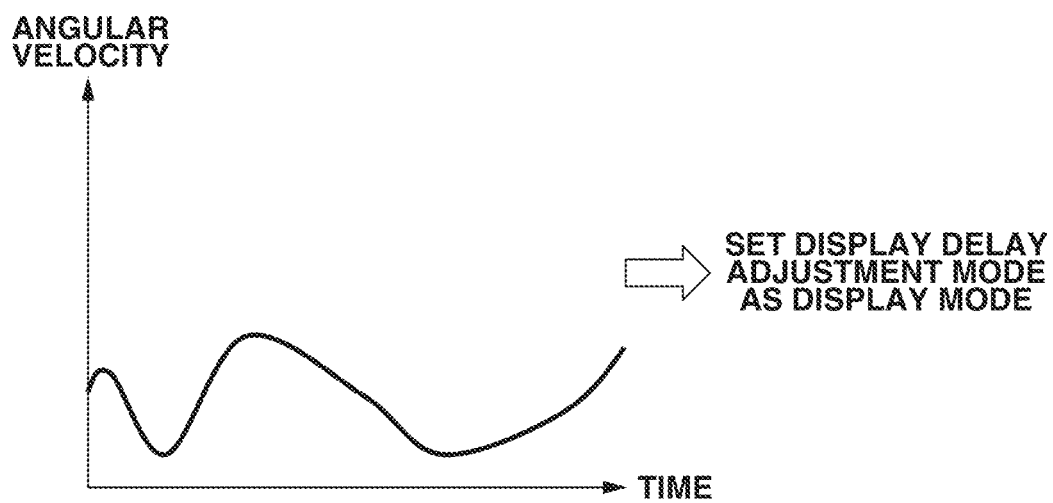
FIGS. 6A and 6B are diagrams illustrating switching between display modes in a case where continuous image-capturing is performed during live view display, according to a second exemplary embodiment of the present disclosure.
Figure 6B:
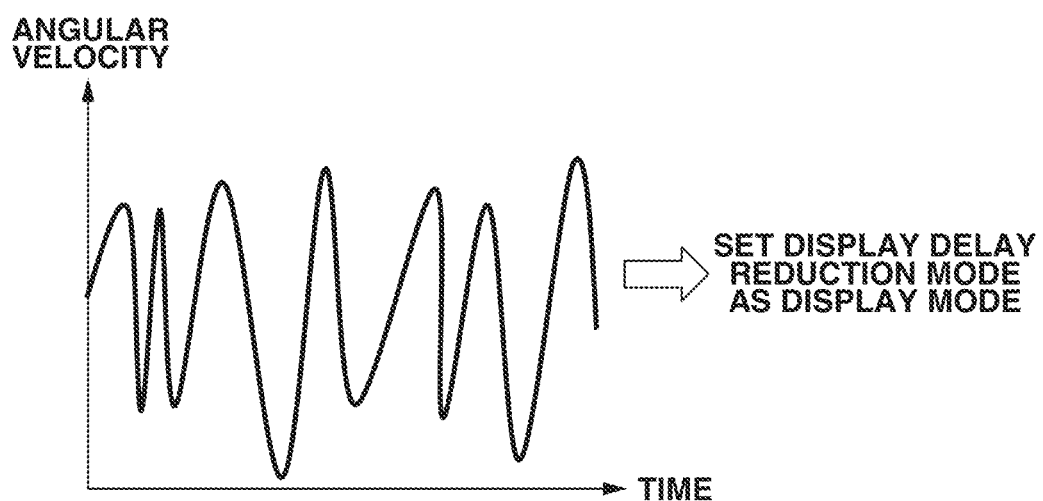

FIGS. 6A and 6B are diagrams illustrating switching between the display modes in a case where the continuous image-capturing is performed during the live view display, according to the second exemplary embodiment of the present invention. Specifically, FIGS. 6A and 6B illustrate changes in angular velocity that occur with the passage of time. FIG. 6A illustrates a case where the degree of angular velocity is small and the change in angular velocity is small with respect to a time variation. FIG. 6B illustrates a case where the degree of angular velocity is large and the change in angular velocity is large with respect to a time variation.

As illustrated in FIG. 6A, in a case where the change in angular velocity is small with respect to a time variation, it is possible to presume that a change in attitude of the image pickup apparatus 100 is small. Therefore, it is highly likely that the user dose not lose sight of the object and an object is stably framed within a field angle. In contrast, as illustrated in FIG. 6B, in a case where the change in angular velocity is large with respect to a time variation, it is possible to presume that a change in attitude of the image pickup apparatus 100 is large. Therefore, it is highly likely that the user loses sight of the object and an object to be imaged is not present within a field angle.

Therefore, in a case where it is possible to determine that the change in angular velocity with respect to a time variation is small, the image pickup apparatus 100 of the present exemplary embodiment sets the display delay adjustment mode as the display mode. On the other hand, in a case where it is possible to determine that the change in angular velocity with respect to a time variation is large, the image pickup apparatus 100 of the present exemplary embodiment sets the display delay reduction mode as the display mode. Specifically, the CPU 103 sets the display delay reduction mode as the display mode, in a case where the number of times the output from the angular velocity sensor 111 exceeds a predetermined threshold (an upper limit or a lower limit) is greater than or equal to a predetermined number of times, in a predetermined period. The CPU 103 sets the display delay adjustment mode as the display mode otherwise.

As described above, the image pickup apparatus 100 of the present exemplary embodiment gives priority to the display for reducing a feeling of strangeness that can be given to the user, in a case where it is possible to determine that a change in angular velocity of the image pickup apparatus 100 is small and thus an object is stably framed. On the other hand, the image pickup apparatus 100 of the present exemplary embodiment gives priority to the display for reducing a delay to implement display for quickly responding to a movement of an object, in a case where it is possible to determine that a change in angular velocity of the image pickup apparatus 100 is large and thus an object is not stably framed. The image pickup apparatus 100 of the present exemplary embodiment can thereby reduce a feeling of strangeness that can be given to the user, when sequentially displaying images different in the time required from start of exposure to completion of acquisition (e.g., the live view image and the still image during the continuous image-capturing) at the display unit 108.

Operation for switching between the display delay reduction mode and the display delay adjustment mode in a third exemplary embodiment of the image pickup apparatus according to the present invention will be described below with reference to FIGS. 7A and 7B. The first exemplary embodiment has been described above using the case where switching between the display modes is performed based on the processing result according to the object tracking by the object tracking unit 110. In contrast, in the present exemplary embodiment, the image pickup apparatus 100 will be described that adopts a configuration for switching the display modes based on a movement amount of an object corresponding to a change in motion vector in the acquired image. Each component of the image pickup apparatus 100 is identical to that in the above-described first exemplary embodiment and therefore will not be described. In addition, operation for switching the display modes is also substantially identical to that in the first exemplary embodiment except that predetermined information for switching the display modes is different, and therefore will not be described.

Figure 7A:
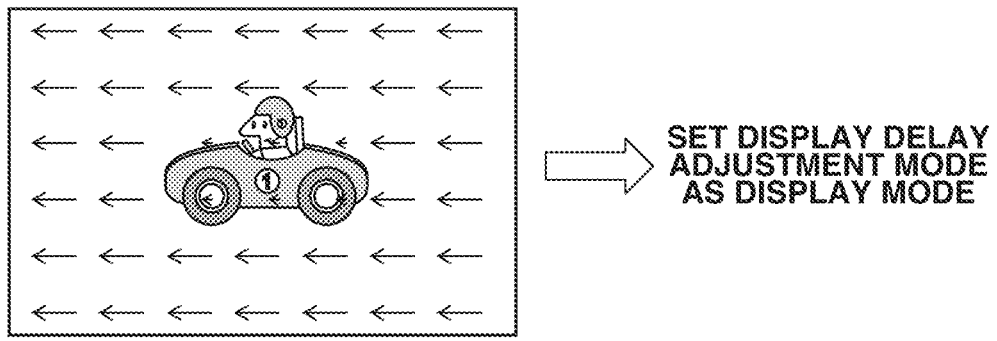
FIGS. 7A and 7B are diagrams illustrating switching between display modes in a case where continuous image-capturing is performed during live view display, according to a third exemplary embodiment of the present disclosure.
Figure 7B:
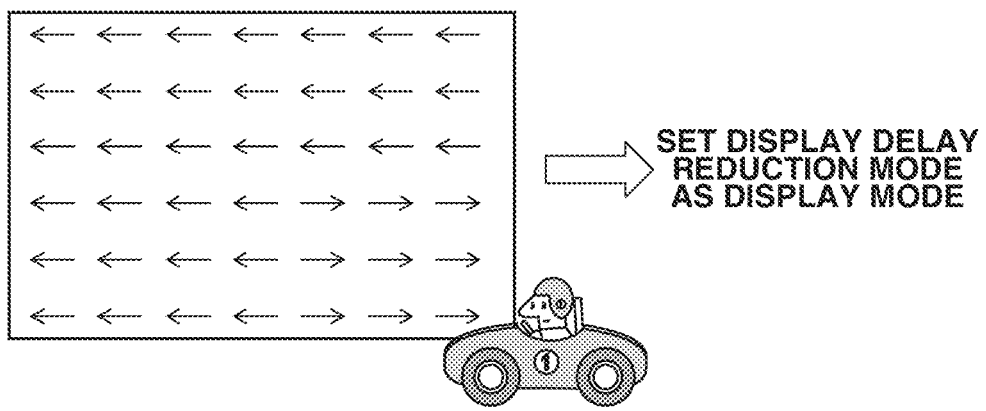

FIGS. 7A and 7B are diagrams illustrating switching between the display modes in a case where the continuous image-capturing is performed during the live view display, according to the third exemplary embodiment of the present invention. Specifically, FIGS. 7A and 7B illustrate a difference between motion vectors based on an object present in a field angle. FIG. 7A illustrates a case where a motion vector in a predetermined block within the field angle is small, and FIG. 7B illustrates a case where a motion vector in the predetermined block within the field angle is large.

As illustrated in FIG. 7A, in a case where a motion vector detected in each of a plurality of blocks within the field angle is small, it is highly likely that a movement of the object in a predetermined area within the field angle is small, and thus the object is stably framed. In contrast, as illustrated in FIG. 7B, in a case where a motion vector detected in each of a plurality of blocks within the field angle is large, there is a high probability that an object making a small movement is not present within the field angle or the user has lost sight of the object.

Therefore, the image pickup apparatus 100 of the present exemplary embodiment sets the display delay adjustment mode as the display mode in a case where it is possible to determine that a motion vector is small, while setting the display delay reduction mode as the display mode in a case where it is possible to determine that a motion vector is large. Specifically, the motion vector calculation unit 112 calculates a motion vector for each of blocks that are areas obtained by dividing each of images acquired in succession. Subsequently, based on the calculated motion vector, the CPU 103 sets the display delay adjustment mode as the display mode in a case where the motion vector of each of a predetermined number or more of blocks (or blocks of a predetermined proportion or more) is small, and sets the display delay reduction mode otherwise.

As described above, the image pickup apparatus 100 of the present exemplary embodiment gives priority to the display for reducing a feeling of strangeness that can be given to the user, in a case where it is possible to determine that the motion vector of the predetermined area within the field angle is small and thus the object is stably framed. Further, the image pickup apparatus 100 of the present exemplary embodiment gives priority to the display for reducing a delay to implement display for quickly responding to a movement of the object, in a case where it is possible to determine that the motion vector of the predetermined area within the field angle is large and thus the object cannot be stably framed. The image pickup apparatus 100 of the present exemplary embodiment can thereby reduce a feeling of strangeness that can be given to the user, when sequentially displaying images different in the time required from start of exposure to completion of acquisition (e.g., the live view image and the still image during the continuous image-capturing) at the display unit 108.

Some exemplary embodiments of the present disclosure have been described above, but the present disclosure is not limited to these exemplary embodiments and enables various alterations and modifications within the scope of the purport thereof. For example, in the exemplary embodiments described above, a configuration has been described where the display delay of the live view image and the display delay of the still image are substantially equal in the display delay adjustment mode, but this should not be construed as limiting. For example, the display delay adjustment mode may be at least a mode in which the difference between the display delay of the live view image and the display delay of the still image is smaller than that in the display delay reduction mode.

Further, in the exemplary embodiments described above, a configuration has been described where the live view image and the still image are alternately displayed at the display unit 108 in a case where the continuous image-capturing is executed during the live view display, but this should not be construed as limiting. For example, there may be provided such a configuration that the live view image and the still image are alternately displayed in a case where the continuous image-capturing is executed in a state where the live view display is not performed (for example, a state where the display unit 108 is turned off). In this case, a configuration for acquiring the live view image without performing display at the display unit 108 may be adopted.

Furthermore, in the exemplary embodiments described above, a configuration has been described where the live view image and the still image are alternately displayed one by one in each of the display modes, but this should not be construed as limiting. For example, a configuration may be adopted where the still image is displayed after a predetermined number of live view images are displayed during the continuous image-capturing, or a configuration may be adopted where the live view image is displayed after a predetermined number of still images are displayed during the continuous image-capturing. Moreover, a configuration for displaying at least one or more still images and at least one or more live view images alternately at the display unit 108 may be adopted. In other words, in the display delay reduction mode and the display delay adjustment mode, it is possible to display the still image and the live view image at the display unit 108 while switching therebetween, and the number of the live view images and the number of the still images in the display are not limited.

In the exemplary embodiments described above, the configuration for enabling automatic switching between the display modes has been described. However, for example, a configuration for enabling a user to manually set the display mode based on a setting menu of the image pickup apparatus 100 may be adopted. In this case, in a case where the display mode (to which priority is given) is set beforehand by the user, switching between the display modes based on the predetermined information (the object tracking, the angular velocity, and the motion vector) in the exemplary embodiments described above may not be performed.

Other Exemplary Embodiments

The present disclosure can also be implemented by supplying a program that implements one or more functions of the above-described exemplary embodiments to a system or apparatus via a network or storage medium, and causing one or more processors in a computer of the system or apparatus to execute processing by reading out the program. The present disclosure can also be implemented by a circuit (e.g., an application-specific integrated circuit (ASIC)) for implementing one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-015728, filed Jan. 31, 2018, which is hereby incorporated by reference herein in its entirety.

What is claimed is:

1. An image pickup apparatus that includes an imaging device, and can perform continuous image-capturing for capturing consecutive images of an object using the imaging device, the image pickup apparatus comprising:
   at least one processor configured to perform operations of the following units;
   a display unit configured to cause display of an image acquired using the imaging device; and
   a display control unit configured to set a first display mode and a second display mode each for consecutively displaying a first display image based on a still image for recording and a second display image based on a live view image at the display unit, while switching between the first display image and the second display image, in continuous image-capturing,
   wherein a time from when the first display image is displayed until when the second display image is displayed next is shorter in the first display mode as compared to the second display mode, and
   wherein a difference between an interval from when the first display image is displayed until when the first display image is displayed next and an interval from when the second display image is displayed until when the second display image is displayed next is shorter in the second display mode as compared to the first display mode.

2. The image pickup apparatus according to claim 1, wherein the display control unit performs switching between the first display mode and the second display mode, based on information about a movement of an object in the continuous image-capturing.

3. The image pickup apparatus according to claim 2, wherein the information about the movement of the object is information about a result of tracking a movement of an object in successive images.

4. The image pickup apparatus according to claim 2, wherein the information about the movement of the object is information about a change in attitude of the image pickup apparatus.

5. The image pickup apparatus according to claim 2, wherein the information about the movement of the object is information about a movement amount of an object in successive images.

6. The image pickup apparatus according to claim 1, wherein a time during which the second display image is displayed is longer than a time during which the first display image is displayed in a predetermined time in the first display mode.

7. The image pickup apparatus according to claim 1, wherein a time from when charge accumulation in the imaging device corresponding to the second image starts until when the second display image corresponding to the second image is displayed at the display unit is longer in the second display mode as compared to the first display mode.

8. The image pickup apparatus according to claim 1, wherein, in the first display mode and the second display mode, at least one or more of the first display images are displayed between a time when the second display image is displayed and a time when the second display image is displayed next.

9. The image pickup apparatus according to claim 8, wherein, in the first display mode and the second display mode, at least one or more of the second display images are displayed between a time when the first display image is displayed and a time when the first display image is displayed next.

10. The image pickup apparatus according to claim 9, wherein, in the first display mode and the second display mode, at least one or more of the first display images and at least one or more of the second display images are alternately displayed.

11. The image pickup apparatus according to claim 1, further comprising an instructing unit configured to provide an instruction for starting the continuous image-capturing,
   wherein the display control unit sets the first display mode or the second display mode as a display mode, in response to the instruction of the start of the continuous image-capturing provided, when causing the display of the second display image consecutively at the display unit.

12. The image pickup apparatus according to claim 1,
   wherein the still image is an image corresponding to a pixel portion of a first number of pixels of a pixel portion of the imaging device, and
   wherein the live view image is an image corresponding to a pixel portion of a second number of pixels less than the first number of pixels of the pixel portion of the imaging device.

13. The image pickup apparatus according to claim 1,
   wherein the live view image is obtained by reading out accumulated electric charges by performing thinning or adding for a pixel from the pixel portion to form the second number of pixels, of the pixel portion of the imaging device.

14. A method of controlling an image pickup apparatus having an imaging device, the method comprising:
   display controlling for setting a first display mode and a second display mode each for consecutively displaying a first display image based on a still image for recording and a second display image based on a live view image, at a display unit, while switching between the first display image and the second display image, in continuous image-capturing,
   wherein a time from when the first display image is displayed until when the second display image is displayed next is short in the first display mode, compared to the second display mode, and
   wherein a difference between an interval from when the first display image is displayed until when the first display image is displayed next and an interval from when the second display image is displayed until when the second display image is displayed next is shorter in the second display mode as compared to the first display mode.

15. A non-transitory computer-readable storage medium storing a computer-executable program for executing a method of controlling an image pickup apparatus having an imaging device, the method comprising:
   display controlling for setting a first display mode and a second display mode each for consecutively displaying a first display image based on a still image for recording and a second display image based on a live view image, at a display unit, while switching between the first display image and the second display image, in continuous image-capturing,
   wherein a time from when the first display image is displayed until when the second display image is displayed next is short in the first display mode, compared to the second display mode, and
   wherein a difference between an interval from when the first display image is displayed until when the first display image is displayed next and an interval from when the second display image is displayed until when the second display image is displayed next is shorter in the second display mode as compared to the first display mode.

\* \* \* \* \*